Patented Aug. 9, 1927.

1,638,342

UNITED STATES PATENT OFFICE.

JOHN J. KESSLER, OF ST. LOUIS, MISSOURI.

PROCESS FOR INDURATING POROUS OBJECTS.

No Drawing.    Application filed August 28, 1925. Serial No. 53,212.

The object of my invention is to produce an indurated porous object by filling the porosity of the object with an inorganic compound which has been solidified by polymerization and which serves as a primer or filler for an application of varnish or paint to the outside of the object, which the primer or filler, on account of its being polymerized to an infusible and insoluble resin, does not greatly affect it by the solvent or oil of the varnish or filler used to provide a waterproofing and insulating film to the outside of the object.

My process consists, therefore, of a two-stage process, and each of the separate stages are old in the art of indurating or of coating objects. To illustrate, there are many processes in use for filling a porous object such as wood, stone or electrical coils with a polymerizing resin such as a phenol aldehyde resin. Such resins have the property of having fluidity and insolubility before they are polymerized. If now they are introduced in a porous object in a non-polymerized condition and can be polymerized inside of the object, it thus affords a means of filling the pores of the object with a substance which completely permeates these pores, but which can be rendered insoluble and infusible.

There are many processes in use for carrying out a result of this kind, either by first soaking the object in solution of aldehyde substance and afterwards treating it with a solution incompletely polymerized phenol aldehyde resin, or again such a result can be brought about by introducing into the pores of the substance a phenol aldehyde varnish containing an excess of aldehyde substance which has not yet reacted upon the fusible phenol aldehyde resin but which can be subsequently made to act upon it after the varnish has been introduced into the pores of the substance by the action of heating.

Such processes of filling and indurating porous substances serve the purpose of introducing into the porous substance an infusible and insoluble resin. It is a fact, however, that such resins are not completely waterproof. They all have a tendency to be brittle and hence do not serve to act as a protecting layer on the outside of the porous substance such as wood or stone or an electrical coil.

On the other hand, it is a well known fact that in order to provide a proper film of homogeneous nature on the outside of a porous substance, it should first be completely filled or primed with some substance upon which the varnish or paint used for finishing has little or no action.

I claim, therefore, a new and useful result in using polymerizing varnishes of the phenol aldehyde variety for the purpose of filling or priming porous substances, and afterwards providing a protective film on the outside of such substances by treating them with certain varnishes or paints made from oxidizing oils such as linseed oil or China wood oil, or by the use of spirit varnishes such as shellac varnish, Manila varnish and other varnishes made by dissolving a spirit soluble resin in alcohol or some other suitable solvent.

In carrying out my process which I claim to be a general one and which can be applied to the waterproofing and indurating of such substances as wood, stone, concrete or plaster, or which can be used for the insulation of electrical coils, I first saturate the porous substance with a phenol aldehyde resin which is in an incompletely polymerized condition, and which can therefore either be made fluid by heating or which can be made fluid by dissolving in some suitable solvent.

The polymerization of such a resin is completed within the porous substance by heating.

After this first stage of the process has been completed, the object is then dipped into a suitable finishing varnish or it is painted or sprayed with a suitable finishing varnish.

If necessary the object can be first smoothed by sanding or grinding in order to provide a smooth and even surface for laying on the finishing varnish, which may be dried either by evaporation of the solvent or by oxidation of the base of the varnish, or by both.

By working in the manner which I have described, it is possible to completely fill and varnish objects which cannot be properly filled by the use of either polymerizing varnish or the finishing varnish alone. In the case of electrical coils, for instance, it is not possible to completely dry the varnish on the inside of the coil and at the same time lay on a layer of this varnish on the outside of the coil because the application of one layer of varnish acts upon the layer underneath it, and if it is desired to lay on a considerable number of layers of varnish, such as is often necessary in the case of insulating electrical coils, it is impossible to provide a completely dry film of varnish on the outside of the coil, and at the same time completely fill the coil with this varnish, because of the fact that one layer of varnish acts upon the layers beneath it and there is a tendency for a soft material to form on the inside of the coil which produces corrosive effects upon the windings of the coil.

I will now give two specific instances of the use of my process for indurating porous objects. The first of these instances will be the application of the process to the finishing of wood. In this case I first soak the wood with a polymerizing varnish and afterwards polymerize this varnish in the porosity of the wood by proper heating. The wood may be afterwards sanded and is then filled with a brittle and rather non-waterproof resin but one which is hard and which is not softened by the application of either shellac or of oil varnishes. The next step in the process is to coat this treated wood with a layer of spirit or oil varnish which provides a continuous film of waterproofing material on the outside of the wood and thus affords a practical method for waterproofing and finishing the wood.

Another instance of the use of my new process is in the insulation of electrical coils whereby a coil is first saturated or impregnated with a phenol aldehyde varnish which is polymerized on the inside of the coil.

The coil is afterwards dipped in baking varnish which can be baked on the outside of the coil in a continuous film and which does not produce any softening of the material on the inside of the coil, but which produces a waterproofed and insulated coil, which is solid and possesses a homogeneous film of insulating varnish, which can be dried by oxidation, and which covers a coil in which the porosity has been filled by a polymerizing varnish which has been hardened by heating.

I claim:

1. The process for indurating porous objects which comprises filling the porosity of the object with a polymerized phenol aldehyde resin and afterwards providing a surface film directly on the outside of the object with a spirit or oil varnish.

2. The process for insulating electrical coils which comprises the filling of the coil with a polymerized phenol aldehyde resin and afterwards directly covering the surface of the coil with an oxidizing varnish.

In testimony that I claim the foregoing I hereunto affix my signature.

JOHN J. KESSLER.